(12) United States Patent
Park et al.

(10) Patent No.: US 6,744,816 B1
(45) Date of Patent: Jun. 1, 2004

(54) VIDEO CODING AND DECODING METHODS

(75) Inventors: Dong-seek Park, Taegu (KR); Kook-yeol Yoo, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 440 days.

(21) Appl. No.: 09/432,426

(22) Filed: Nov. 2, 1999

(30) Foreign Application Priority Data

Nov. 2, 1998 (KR) ............................. 98-46824

(51) Int. Cl.⁷ ............................................... H04B 1/66
(52) U.S. Cl. ................................................... 375/240
(58) Field of Search ........................... 375/240, 240.26, 375/240.27, 240.28, 240.16, 240.17; 714/746, 747, 748, 749; 370/471, 472, 473, 474, 475–476; 348/384.1, 426.1, 441.1; H04B 1/66

(56) References Cited

U.S. PATENT DOCUMENTS

| | | | | |
|---|---|---|---|---|
| 5,754,553 A | * | 5/1998 | Shimoda | 370/471 |
| 5,802,311 A | | 9/1998 | Wronski | |
| 5,850,526 A | * | 12/1998 | Chou | 395/200.77 |
| 5,968,197 A | * | 10/1999 | Doiron | 714/748 |
| 6,026,506 A | * | 2/2000 | Anderson et al. | 714/746 |
| 6,169,843 B1 | * | 1/2001 | Lenihan et al. | 386/46 |
| 6,201,834 B1 | * | 3/2001 | Zhu | 348/19 |
| 6,236,432 B1 | * | 5/2001 | Lee | 348/240.26 |
| 6,243,269 B1 | * | 6/2001 | Dibene, II et al. | 370/335 |
| 6,310,897 B1 | * | 10/2001 | Watanabe et al. | 370/522 |

FOREIGN PATENT DOCUMENTS

| | | | |
|---|---|---|---|
| GB | 2 306 867 | 5/1997 | H04L/1/20 |
| WO | 97/16046 | 5/1997 | H04Q/11/04 |
| WO | WO 97/38549 A1 | 10/1997 | |

OTHER PUBLICATIONS

Korean Office Action with English language translation.

* cited by examiner

Primary Examiner—Tung T. Vo
(74) Attorney, Agent, or Firm—Sughrue Mion, PLLC

(57) ABSTRACT

Video coding and decoding methods. The video coding method includes: receiving channel status information indicating an error profile of the communication channel; and adaptively adding redundancy information into data packets divided by syntax with a layer configuration, based on the channel status information. The video decoding method includes: receiving an encoded video bitstream; identifying whether an additional layer is present and which layer has been added; and decoding corresponding layers based on the information about the additional layer. The video coding and decoding methods can be implemented in a video coder-decoder (CODEC) to avoid erroneous decoding in an error-prone channel, thus improving error-resilience of the CODEC.

42 Claims, 3 Drawing Sheets

VIDEO CODING AND DECODING METHODS

BACKGROUND OF THE INVENTION

1. Field of the Invention

The present invention relates to video coding and decoding methods, and more particularly, to video coding and decoding methods which utilize a data partitioning structure, and video coding and decoding apparatuses which use these methods.

2. Description of the Related Art

Recently, the video coding group, so called Question 15 under Study Group 16, in the International Telecommunication Unit (ITU), which has defined many standards associated with video conferencing such H.32X, has been working on development of an advanced video coding scheme named H.263++. A large amount of effort has been spent in making H.263++ resilient against an error-prone mobile channel. Thus far, so many technical contributions for error resilience have been proposed to Q.15/SG16 in ITU-T. Among the technical proposals, data partitioning and reversible variable length coding (RVLC), jointly proposed by UCLASamsung, have had a great impact on forming the error resilience features in H.263++. Although the error resilience features have not yet been adopted in the H.263++ scheme, most of the recent technical contributions in the error resilience session of Q.15/SG16 in ITU-T have been based on the use of data partitioning and RVLC. The present invention is directed to the data partitioning.

SUMMARY OF THE INVENTION

It is an object of the present invention is to provide a method of coding video data by adaptively adding redundancy bits into a video bitstream in accordance with a channel status and the degree of importance of syntax.

Another object of the present invention is to provide a method of decoding the video bitstream encoded by the video coding method.

According to an aspect of the present invention, there are provided a video coding method implemented in a video data transceiver for transmitting and receiving video data through a communications channel, the method comprising: receiving channel status information indicating an error profile of the communication channel; and adaptively adding redundancy information into data packets divided by syntax with a layer configuration, based on the channel status information.

In another embodiment of the present invention, there is provided a video coding method implemented in a video data transceiver for transmitting and receiving video data through a communications channel, the method comprising: (a) receiving channel status information containing information that is indicative of an error profile of the channel; (b) determining whether an additional layer is required, based on the channel status information; (c) if, in the step (b), it is determined that the additional layer is not required, composing a first layer containing video data information and administrative information; (d) if, in the step (b), it is determined that only a second layer is required, configuring a second layer by adding a first auxiliary information containing redundancy information corresponding to the information on the first layer; (e) if, in the step (b), it is determined that both the second and third layers are required, composing a third layer by adding first auxiliary information containing redundancy information corresponding to the information on the first layer, and a third layer by adding a second auxiliary information containing other redundancy information corresponding to the information on the first layer.

Preferably, if, in the step (b), it is determined that either only the second layer, or both the second and third layers are required, the video coding method further comprises adding a predetermined unique marker to the preceding part of the corresponding packet in the configuration of the second layer. Also, if, in the step (b), it is determined that either only the second layer, or both the second and third layers are required, the video coding method may further comprise adding a second flag bit indicating the presence of an additional layer.

Preferably, the first auxiliary information contains information on coding parameters of the picture data in the first layer, and one or more COD bits indicating whether the coding is performed. Also, the COD bit may consist of three bits per macro block. Also, the first auxiliary information may contain one or more MCBPC (MaCro Block Pattern Chrominance) bit per macro block, which indicate kinds of chrominance of macro blocks, and the MCBPC bit may consist of 5 bits per macro block to be coded.

Preferably, the second auxiliary information contains information on coding parameters of the picture data in the first layer. For example, the second auxiliary information may contain bits indicating the number of MCBPC (MaCro Block Pattern Chrominance) bits per macro block, the MCBPC indicating kinds of chrominance of macro blocks. The bit indicating the number of MCBPC bits may consist of 4 bits per QCIF (Quarter Common Intermediate Format). Also, the second auxiliary information may contain one or more COD bit indicating whether the coding is performed, and the COD bit may consist of 1 bit per macro block. Preferably, the second auxiliary information contains MB (macro block) Type bits indicating types of macro block, and the MB Type bits consist of 2 bits per macro block.

According to another aspect of the present invention, there is provided a video decoding method implemented in a video data transceiver for transmitting and receiving video data through a communications channel, the method comprising: inputting a video bitstream to which redundancy information has been adaptively added with a layered configuration, to data packets divided by syntax; identifying whether an additional layer is present and which layer has been added; and decoding corresponding layers based on the information about the additional layer.

In another embodiment of the present invention, a video decoding method implemented in a video data transceiver for transmitting and receiving video data through a communications channel, comprises: inputting a video bitstream to which redundancy information has been adaptively added with a layered configuration, to data packets divided by syntax; defining a first layer by detecting a resynchronization marker from the video bitstream, and identifying a first flag bit indicating the presence or absence of an additional layer in the first layer; if the first flag bit indicates the absence of the additional layer, decoding the first layer; if the first flag bit indicates the presence of the additional layer, identifying a marker indicating the start of a second layer; identifying a second flag bit indicating the presence or absence of a third layer; if the second flag bit indicates the absence of the third layer, decoding the first and second layers; and if the second flag bit indicates the presence of the third layer, decoding the first, second and third layers.

The invention may be embodied in a general purpose digital computer by running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
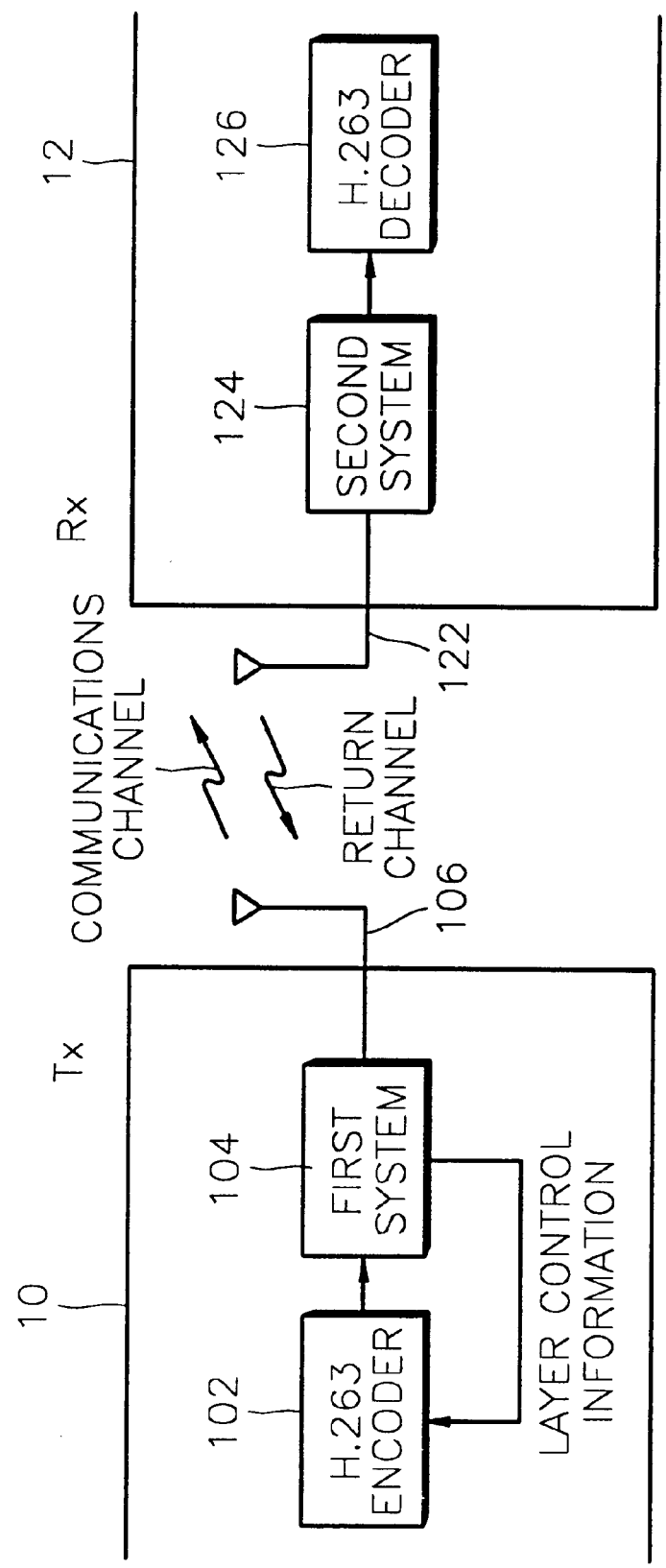
FIG. 1 is a block diagram of a video data transceiver system which is used to implement video coding and decoding methods according to the present invention.

Referring now to FIG. 1, a video data transceiver system, which is used to implement video coding and decoding methods according to the present invention, includes a transmitter 10 and a receiver 12. The transmitter 10 includes an H.263 encoder 102 and a first system 104, and the receiver 12 includes an H.263 decoder 126 and a second system 124.

In the operation of the video data transceiver system, the H.263 encoder 102 of the transmitter 10 encodes video data, and the first system 104 receives and multiplexes the encoded video data and adds control information to transmit a video bitstream through a radio frequency (RF) stage on a wireless communications channel. When the receiver 12 receives the video bitstream through the wireless communications channel, the second system 124 demultiplexes the received bitstream and extracts the control information. The demultiplexed encoded video bitstream is decoded by the H.263 decoder 126. Also, during the decoding process by the H.263 decoder 126, channel status information containing error information of the transmitted video bitstream may be extracted. Then, the receiver 12 transmits the channel status information through an extra return channel.

The first system 104 of the transmitter 10 receives through the return channel the channel status information that contains status information about the encoded video bitstream, and transmits layer control information to the H.263 encoder 102 based on the received information, to allow the H.263 encoder 102 to define a redundancy adding configuration. The H.263 encoder 102 adaptively adds redundancy information into the video data stream based on the received layer control information. That is, since the addition of redundancy information is controlled in accordance with the channel status, error resilience against an error-prone wireless channel is improved.

Figure 2:
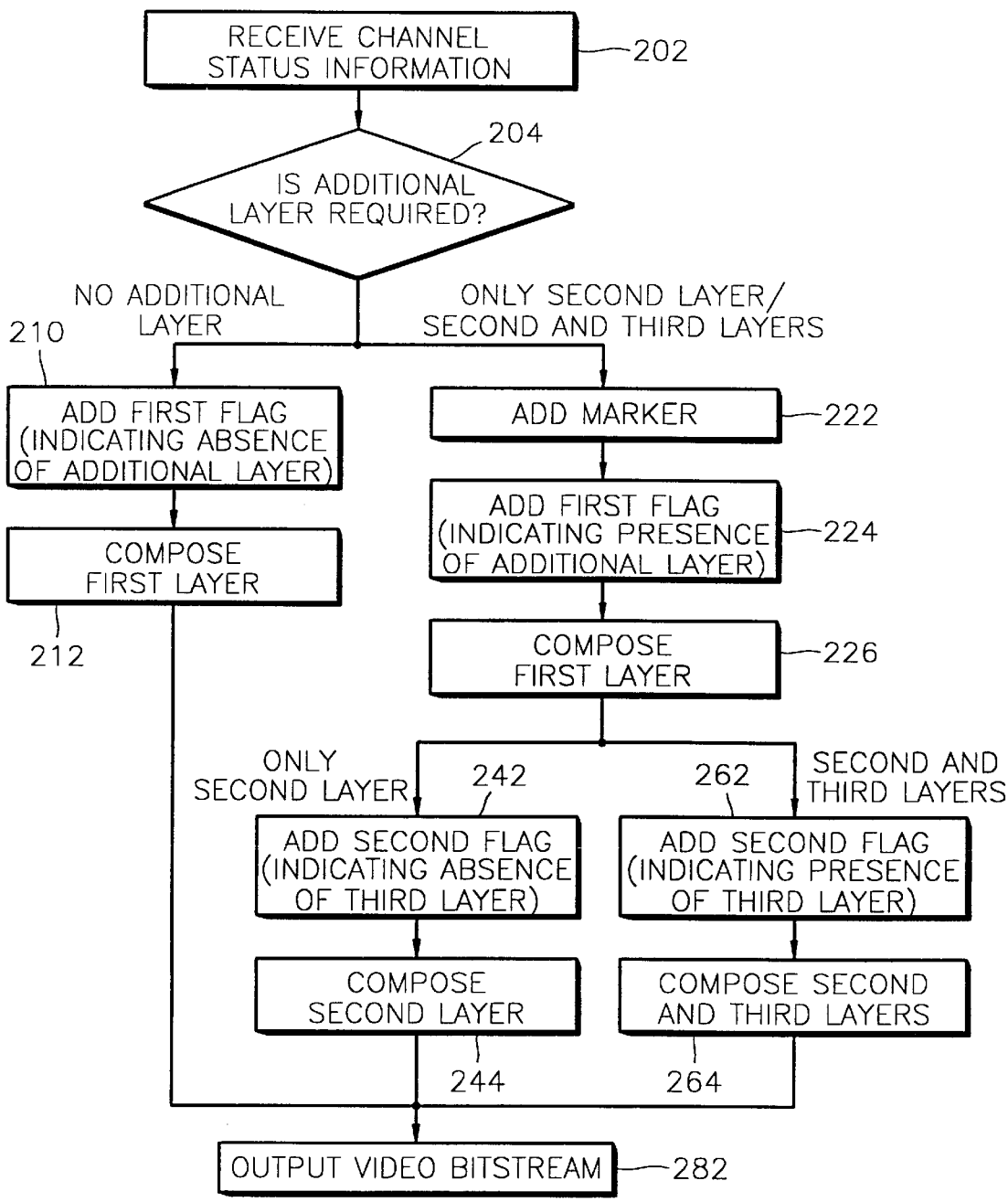
FIG. 2 is a flowchart illustrating the major steps of a video coding method according to an embodiment of the present invention.

FIG. 2 is a flowchart illustrating the major steps of the video encoding method according to an embodiment of the present invention. Referring to FIG. 2, the video encoding method includes receiving channel status information that contains information indicating error profile of a channel (step 202) and determining whether an additional layer is required, based on the channel status information (step 204). In this embodiment, a first layer with respect to a baseline stream, and additional layers including second and third layers, can be defined.

Then, if the step 204 determines that an additional layer is not required, a first flag bit is added into the data packet to indicate the absence of the additional layer (step 210), and the first layer is configured (step 212). Conversely, if the step 204 determines that only the second layer is required or both the second and third layer are required, the first flag bit is added to indicate the presence of the additional layer (step 204) and then the first layer is configured (step 226). Then, in the case where only the second layer is needed, a second layer is composed by adding first auxiliary information containing redundancy information corresponding to the information of the first layer (step 244). Meanwhile, in the case where both the second and third layers are needed, the second layer is composed by adding the first auxiliary information containing redundancy information corresponding to the information of the first layer, and the third layer is also composed by adding second auxiliary information containing other redundancy information corresponding to the information of the first layer (step 264). Also, in the case where the step 204 determines that additional layers, only the second layer or both the second and third layers, are required, preferably, prior to the step 224, a predetermined unique marker is added into the preceding part of the corresponding packet of the additional layer (step 222). Also, prior to the steps 244 and 264, a second flag bit may be added into the corresponding packet to indicate the absence (step 242) or presence (step 262) of the third layer.

Through the above steps, redundancy information is adaptively added into the data packet divided by syntax with the layered configuration according to the channel status information, and thus a video bitstream results (step 282).

As can be expected to those skilled in the art, as more layers are included in a packet, error resilience is progressively improved, but the coding efficiency is sacrificed. Selection of modes (first layer only, first and second layers, or first, second and third layers) can be fully configured in a system by monitoring channel status, and one having skill in the art can properly select a mode.

Figure 3:
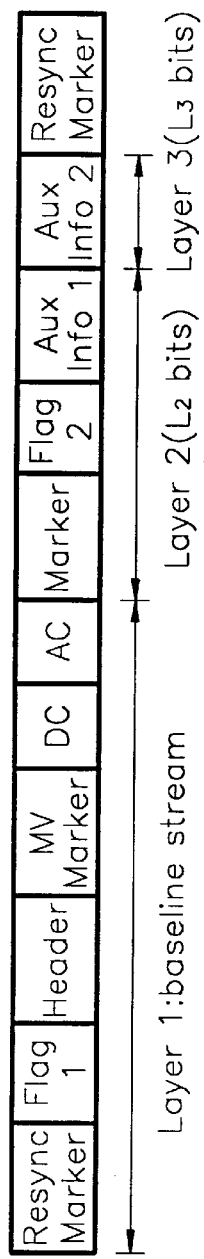
FIG. 3 shows an example of a bitstream encoded by the video coding method according to the present invention.

In the present embodiment, for simplicity, experiments were conducted with QCIF (Quarter Common Intermediate Format) sequences and 11 macro blocks (MBs) in each packet. FIG. 3 shows a configuration of the bitstream encoded by the video coding method according to the present invention. The bitstream of FIG. 3 includes a first layer (Layer 1) only, both the first and second layers (Layer 1+2), or the first, second and third layers (Layer 1+2+3). The Layer 1 includes a first flag bit (Flag 1) indicating whether an additional layer is present or not, and header bits (Header) containing video data information such as DC, AC and MV bits, which are apparent to one skilled in the art relating to MPEG technology, and information about coding parameters. The Layer 2 includes a predetermined unique marker (Marker) at the preceding part thereof, a second flag bit (Flag 2) that is indicative of the presence of the additional layer, and first auxiliary information (Aux Info 1) containing redundancy information corresponding to the information of the first layer. The Layer 3 includes second auxiliary information (Aux Info 1) containing information about coding parameters with respect to the picture data of the first layer.

Figure 4:
FIG. 4 shows an example of the Layer 2 shown in FIG. 3.

FIG. 4 shows an example of the Layer 2 shown in FIG. 3. Because the Layer 2 is composed only when it is determined that an additional layer is needed, as mentioned with reference to FIG. 2, a predetermined unique Marker, for example, a 22-bit unique code (0000 0000 0000 0000 1110 00), is added into the preceding part of the packet of the Layer 2. The packet of the Layer 2 includes a 1-bit Flag 2, 3 bits of COD per MB, which are indicative of coding status, and 5 bits of MCBPC (MaCro Block Pattern Chrominance) per MB, which indicate kinds of chrominance of MBs. Since the number of macro blocks is 11, 33 bits of COD are included in the packet of the Layer 2. Also, since the presence or absence of MCBPC depends on whether coding is performed or not, the number of bits thereof ranges between 0 and 55.

Figure 5:
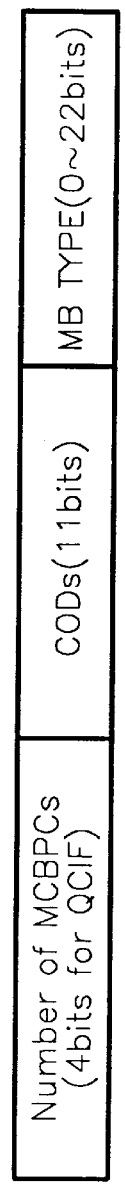
FIG. 5 shows an example of the Layer 3 shown in FIG. 3.

FIG. 5 shows an example of the Layer 3 shown in FIG. 3. Referring to FIG. 5, the Layer 3 contains bits as a second auxiliary information, which represent the number of MCBPC bits that are indicative of kinds of chrominance of MBs. Preferably, the bits representing the number of MCBPC bits consist of four bits per QCIF. Also, the Layer 3 contains 1 bit of COD per MB, that is, 11 bits of COD. Also, the Layer 3 contains MB Type bits representing types of MB. Here, preferably, the MB Type bit consists of two bits per MB. Also, since the presence or absence of the MB Type bit depends on whether or not the coding is performed, the number of MB Type bits ranges between 0 and 22.

Computer simulation was performed to evaluate the video coding and decoding methods according to the embodiment of the present invention, based on the common simulation conditions which have been established for evaluation of technical contributions in terms of error profiles, coding parameters such as bit rate and frame rate, minimum number of frames to be encoded, and more by the ITU-T Q.15/SG16 in July 1998. In accordance with the common conditions, 950 frames of four test sequences aiming at 48 kbps/10 fps were encoded. A quantizing coefficient of a quantizer for the INTRA frames were set to 15, and the number of frames skipped was set to 2 for 10 fps. Among a variety of recommended error profiles, three wideband CDMA error profiles were chosen for use, whose characteristics are shown in Table 1.

TABLE 1

| Error Profile | Doppler Frequency [Hz] | Average BER | Average Burst Length [bits] |
|---|---|---|---|
| Error 1 | 70 | 1.26□ OE-3 | 17 |
| Error 2 | 5.3 | 8.17□ OE-5 | 11 |
| Error 3 | 211 | 9.37□ OE-5 | 11 |

Tables 2 through 5 show measured average PSNR (peak signal-to-noise ratio) in dB for the first 500 decoded frames. Frame loss for each case is almost constant for each error profile.

In particular, Table 2 shows the average PSNR in terms of channel error with respect to a first sample sequence (referred to as "Mother and daughter sequences" at 32 kbps/10 fps. Table 3 shows average PSNR in terms of channel error with respect to a second sample sequence (referred to as "Container sequences") at 32 kbps/10 fps. Table 4 shows average PSNR in terms of channel error with respect to a third sample sequence (referred to as "Forman sequences") at 48 kbps/10 fps. Table 5 shows average PSNR by channel error with respect to a fourth sample sequence (referred to as "News sequences").

TABLE 2

| Layer (bit rate) | Error 1 | Error 2 | Error 3 |
|---|---|---|---|
| H.263++ (32 kbps) | 27.34 | 29.63 | 29.10 |
| Data Partitioning (DP) | 29.10 | 30.02 | 29.98 |
| DP + Layer 2 | 30.26 | 30.89 | 30.03 |
| DP + Layer 2/3 | 30.87 | 31.02 | 30.29 |

TABLE 3

| Layer (bit rate) | Error 1 | Error 2 | Error 3 |
|---|---|---|---|
| H.263++ (32 kbps) | 28.38 | 29.96 | 29.68 |
| Data Partitioning (DP) | 29.79 | 30.01 | 29.98 |
| DP + Layer 2 | 30.02 | 30.30 | 30.10 |
| DP + Layer 2/3 | 30.08 | 30.57 | 30.37 |

TABLE 4

| Layer (bit rate) | Error 1 | Error 2 | Error 3 |
|---|---|---|---|
| H.263++ (48 kbps) | 24.78 | 28.10 | 27.69 |
| Data Partitioning (DP) | 28.89 | 29.77 | 29.42 |
| DP + Layer 2 | 29.56 | 30.02 | 29.42 |
| DP + Layer 2/3 | 29.87 | 30.10 | 29.97 |

TABLE 5

| Layer (bit rate) | Error 1 | Error 2 | Error 3 |
|---|---|---|---|
| H.263++ (48 kbps) | 25.35 | 30.47 | 30.01 |
| Data Partitioning (DP) | 28.65 | 30.94 | 30.30 |
| DP + Layer 2 | 29.84 | 31.10 | 30.93 |
| DP + Layer 2/3 | 30.04 | 31.77 | 31.22 |

As shown in Tables 2 through 5, the average PSNR sequentially increases in the case of using the simple H.263+ encoding, the case of encoding based on data partitioning (DP), the case of adding the Layer 2 based on the DP, and the case of adding the Layers 2 and 3. In particular, referring to Table 2 where the first sample sequence (32 kbps/10 fps) is used, for Error 1, the average PSNR was 27.34 dB in the case of applying the conventional H.263+ encoding, 29.10 dB in the case of encoding based on the DP, 30.26 dB in the case of adding Layer 2 based on the DP, and 30.87 dB in the case of adding Layers 2 and 3 based on the DP.

According to the results of a demonstration for picture quality comparison with respect to the error profiles using D1 tape, the use of simple H.263++ can produce best picture quality under error-free channel conditions. However, error resilience affects the picture quality more in an error-prone channel. The encoding and decoding methods according to the present invention can sharply decrease the occurrence of fatally erroneous pictures due to an error-prone channel, thereby improving the overall picture quality.

Also, in general, the compression ratio and coding efficiency are inversely proportional to error robustness. Given a channel having certain bit budget, it is required to add redundancy information into a source-encoded bitstream, which sacrifices coding efficiency in a decreased compression ratio, so as to make the encoded bitstream more error-resilient. In addition to the above mentioned features, there is an advantage of redundancy in fixed length while doing rate control. The variation of the number of bits for redundancy information can lead to a very good approximation of desirable rate control.

As described above, the video encoding and decoding methods according to the present invention can be implemented in a video coder-decoder (CODEC) to avoid erroneous decoding in an error-prone channel, so that the PSNR is improved, thus enhancing the overall picture quality.

Also, the video coding and decoding methods according to the present invention can be implemented by video coding and decoding apparatuses, respectively. Preferably, the video coding apparatus (not shown) includes a channel information receiving unit, an additional layer determining unit and an encoding unit. The channel information receiving portion receives channel status information representing an error profile of the channel. The additional layer determining unit determines whether or not an additional layer is needed. The encoding unit generates a first layer data field containing picture data information and management information. Also, the encoding portion adds first auxiliary information as a second layer data field, which contains redundancy information corresponding to the information of the first layer, into the first layer data field. Also, if the additional layer determining unit determines that either only the second layer, or both the second and third layers are required, the encoding unit adds second auxiliary information, which contains other redundancy information corresponding to the information of the first layer, into the signal containing the first auxiliary information.

Preferably, the video decoding apparatus (not shown) includes a bitstream inputting unit, an identifying unit and a decoding unit. The bitstream inputting unit inputs a video bitstream to which redundancy information has been adaptively added with a layered configuration, into a data packet divided by syntax. The identifying portion detects a resynchronization marker (Resync Marker) from the video bitstream to define the first layer, and identifies a first flag bit that is indicative of the presence of an additional layer in the first layer. If the first flag bit represents the presence of an additional layer, the identifying unit identifies a marker indicating the start of the second layer. Also, the identifying unit identifies a second flag bit indicating the presence of a third layer.

The decoding unit decodes the first layer if the first flag bit represents that the additional layer is absent, and decodes the first and second layers if the second flag bit represents that the third layer is absent. Also, the decoding unit decodes the first, second and third layers if the second flag bit represents that the third layer is present.

The video coding and decoding methods according to the present invention may be embodied in a general purpose digital computer by running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

What is claimed is:

1. A video coding method implemented in a video data transceiver for transmitting and receiving video data through a communications channel, the method comprising the steps of:

receiving channel status information indicating an error profile of the communication channel; and adaptively adding redundancy information into data packets, the data packets being syntax divided in a layer configuration based on the channel status information.

2. A video coding method implemented in a video data transceiver for transmitting and receiving video data through a communications channel, the method comprising the steps of:

(a) receiving channel status information containing information that is indicative of an error profile of the communications channel;

(b) determining, based on the channel status information, whether an additional layer is required;

(c) if, in step (b), it is determined that the additional layer is not required, composing a first layer containing video data information and administrative information;

(d) if, in step (b), it is determined that a second layer is required, configuring a second layer by adding first auxiliary information which contains redundancy information corresponding to the information of the first layer;

(e) if, in step (b), it is determined that both the second and third layers are required, composing a third layer by adding the first auxiliary information which contains redundancy information corresponding to the information of the first layer of step (d), and a third layer by adding a second auxiliary information which contains other redundancy information corresponding to the information of the first layer.

3. The video coding method of claim 2, further comprising the step of adding a predetermined unique marker to a preceding part of a corresponding packet in the configuration of the second layer if, in the step (b), it is determined that either only the second layer, or both the second and third layers are required.

4. The video coding method of claim 2, further comprising the step of adding a second flag bit indicating a presence of an additional layer if, in the step (b), it is determined that either only the second layer, or both the second and third layers are required.

5. The video coding method of claim 2, wherein the first auxiliary information contains information on coding parameters of the video data in the first layer.

6. The video coding method of claim 2, wherein the first auxiliary information contains one or more COD bits indicating whether the coding is performed.

7. The video coding method of claim 6, wherein the COD bit consists of three bits per macro block.

8. The video coding method of claim 2, wherein the first auxiliary information contains one or more MCBPC (MaCro Block Pattern Chrominance) bit per macro block, which indicate kinds of chrominance of macro blocks.

9. The video coding method of claim 8, wherein the MCBPC bit consists of 5 bits per macro block to be coded.

10. The video coding method of claim 2, wherein the second auxiliary information contains information on coding parameters of the video data in the first layer.

11. The video coding method of claim 2, wherein the second auxiliary information contains bits indicating the number of MCBPC (MaCro Block Pattern Chrominance) bits per macro block, the MCBPC indicating kinds of chrominance of macro blocks.

12. The video coding method of claim 11, wherein the bit indicating the number of MCBPC bits consists of 4 bits per QCIF (Quarter Common Intermediate Format).

13. The video coding method of claim 12, wherein the second auxiliary information contains one or more COD bit indicating whether the coding is performed.

14. The video coding method of claim 13, wherein the COD bit consists of 1 bit per macro block.

15. The video coding method of claim 2, wherein the second auxiliary information contains MB (macro block) Type bits indicating types of macro block.

16. The video coding method of claim 15, wherein the MB Type bits consist of 2 bits per macro block.

17. A computer readable medium having embodied thereon a computer program for video coding,
wherein the video coding comprises the steps of:
(a) receiving channel status information containing information indicative of an error profile of a communication channel;
(b) determining, based on the channel status information, whether an additional layer is required;
(c) composing a first layer containing video data information and management information if, in step (b), it is determined that the additional layer is not required;
(d) if, in step (b), it is determined that a second layer is required, composing a second layer by adding first auxiliary information which contains redundancy information corresponding to the information of the first layer;
(e) if, in step (b), it is determined that both the second and third layers are required, composing a second layer by adding first auxiliary information which contains redundancy information corresponding to the information of the first layer in step (d), and a third layer by adding second auxiliary information containing other redundancy information corresponding to the information of the first layer.

18. The computer readable medium of claim 17, wherein the video coding further comprises adding a predetermined unique marker to a preceding part of a corresponding packet in the configuration of the second layer if it is determined in step (b) that either only the second layer, or both the second and third layers are required.

19. The computer readable medium of claim 17, wherein the video coding further comprises adding a second flag bit indicating a presence of an additional layer if it is determined in step (b) that either only the second layer, or both the second and third layers are required.

20. The video coding method of claim 17, wherein the first auxiliary information contains information on coding parameters of the video data in the first layer.

21. The video coding method of claim 17, wherein the first auxiliary information contains one or more COD bits indicating whether the coding is performed.

22. The video coding method of claim 21, wherein the COD bit consists of three bits per macro block.

23. The video coding method of claim 17, wherein the first auxiliary information contains one or more MCBPC (MaCro Block Pattern Chrominance) bit per macro block, which indicate kinds of chrominance of macro blocks.

24. A video coding apparatus for encoding video data to be transmitted through a communication channel, the video coding apparatus comprising:
means for receiving channel status information containing information that is indicative of an error profile of the communication channel;
means for determining whether an additional layer is required, based on the channel status information; and
encoding means for generating a first layer data field containing video data information and administrative information,
if the means for determining whether the additional layer is required determines that a second layer is required, adding first auxiliary information as a second layer data field, which contains redundancy information corresponding to the information of the first layer data field, and
if the means for determining whether the additional layer is required determines that both the second and third layers are required, adding first auxiliary information as a second layer data field, which contains redundancy information corresponding to the information of the first layer data field, and a second auxiliary information, as a third layer data field, which contains other redundancy information corresponding to the information of the first layer data field.

25. The video coding apparatus of claim 24, wherein encoding means adds a predetermined unique marker into a preceding part of a corresponding layer if it is determined that either only the second layer or both the second and third layers are required.

26. The video coding apparatus of claim 24, wherein encoding means adds a second flag bit indicating a presence of an additional layer if it is determined that either only the second layer or both the second and third layers are required.

27. The video coding apparatus of claim 24, wherein the first auxiliary information contains information on coding parameters of the video data in the first layer.

28. The video coding apparatus of claim 27, wherein the first auxiliary information contains one or more COD bits indicating whether the coding is performed.

29. The video coding apparatus of claim 28, wherein the COD bit consists of three bits per macro block.

30. The video coding apparatus of claim 28, wherein the first auxiliary information contains one or more MCBPC (MaCro Block Pattern Chrominance) bit per macro block, which indicate kinds of chrominance of macro blocks.

31. A video decoding method implemented in a video data transceiver for transmitting and receiving video data through a communications channel, the method comprising:
inputting a video bitstream to which redundancy information has been adaptively added to data packets based on channel status information indicating an error profile of the communication channel, the data packets being syntax divided in a layered configuration;
identifying whether an additional layer is present and, when an additional layer is present, determining which layer has been added; and
decoding corresponding layers based on information about the additional layer.

32. A video decoding method implemented in a video data transceiver for transmitting and receiving video data through a communications channel, the method comprising:
inputting a video bitstream to which redundancy information has been adaptively added in data packets, the data packets being syntax divided in a layered configuration;
defining a first layer by detecting a resynchronization marker from the video bitstream, and identifying a first flag bit indicating a presence or absence of an additional layer in the first layer;
if the first flag bit indicates the absence of the additional layer, decoding the first layer;
if the first flag bit indicates the presence of the additional layer, identifying a marker indicating a start of a second layer;
identifying a second flag bit indicating a presence or absence of a third layer;
if the second flag bit indicates the absence of the third layer, decoding the first and second layers; and if the second flag bit indicates the presence of the third layer, decoding the first, second and third layers.

33. A computer readable medium having embodied thereon a computer program for video decoding,
wherein the video decoding comprises the steps of:
(a) inputting a video bitstream to which redundancy information has been adaptively added in data packets the data packets being syntax divided in a layered configuration;
(b) defining a first layer by detecting a resynchronization marker from the video bitstream, and identifying a first flag bit indicating a presence or absence of an additional layer in the first layer;
(c) if the first flag bit indicates an absence of an additional layer, decoding the first layer;
(d) if the first flag bit indicates a presence of an additional layer, identifying a marker indicating a start of a second layer;
(e) identifying a second flag bit indicating a presence or absence of a third layer;
(f) if the second flag bit indicates an absence of the third layer, decoding the first and second layers; and
(g) if the second flag bit indicates a presence of the third layer, decoding the first, second and third layers.

34. A video decoding apparatus for decoding encoded video data, comprising:
means for inputting a video bitstream to which redundancy information has been adaptively added in data packets, the data packets being syntax divided in a layered configuration;
identifying means for defining a first layer by detecting a resynchronization marker from the video bitstream, identifying a first flag bit indicating a presence or absence of an additional layer in the first layer, identifying a marker indicating a start of a second layer if the first flag bit indicates a presence of an additional layer, and identifying a second flag bit indicating a presence or absence of a third layer; and
means for decoding the first layer if the first flag bit indicates the absence of an additional layer, decoding the first and second layer if the second flag bit indicates the absence of the third layer, and decoding the first, second and third layers if the second flag bit indicates the presence of the third layer.

35. A video coding apparatus for encoding video data to be transmitted through a communication channel, the video coding apparatus comprising:
a channel information receiving unit which receives channel status information containing information indicative of an error profile of the communication channel;
an additional layer determining unit which, based on the channel status information, determines whether an additional layer is required; and
an encoding unit which generates a first layer data field containing video data information and administrative information, wherein if said additional layer determining unit determines that a second layer is required, first auxiliary information is added as a second layer data field which contains redundancy information corresponding to the information of the first layer data field, and
if said additional layer determining unit determines that both the second and third layers are required, first auxiliary information is added as a second layer data field which contains redundancy information corresponding to the information of the first layer data field, and second auxiliary information is added as a third layer data field which contains other redundancy information corresponding to the information of the first layer data field.

36. The video coding apparatus of claim 35, wherein said encoding unit adds a predetermined unique marker into a preceding part of a corresponding layer if it is determined that either only the second layer or both the second and third layers are required.

37. The video coding apparatus of claim 35, wherein said encoding unit adds a second flag bit indicating a presence of an additional layer if it is determined that either only the second layer or both the second and third layers are required.

38. The video coding apparatus of claim 35, wherein the first auxiliary information contains information on coding parameters of video data in the first layer.

39. The video coding apparatus of claim 38, wherein the first auxiliary information contains one or more COD bits indicating whether the coding is performed.

40. The video coding apparatus of claim 39, wherein the COD bit includes three bits per macro block.

41. The video coding apparatus of claim 39, wherein the first auxiliary information contains one or more MCBPC (MaCro Block Pattern Chrominance) bits per macro block, which indicate kinds of chrominance of macro blocks.

42. A video decoding apparatus for decoding encoded video data, comprising:
a bitstream inputting unit which inputs a video bitstream to which redundancy information has been adaptively added in data packets, the data packets being syntax divided in a layered configuration;
an identifying unit which defines a first layer by detecting a resynchronization marker from the video bitstream, identifies a first flag bit indicating a presence or absence of an additional layer in the first layer, identifies a marker indicating a start of a second layer if the first flag bit indicates a presence of an additional layer, and identifies a second flag bit indicating a presence or absence of a third layer; and
a decoding unit which decodes the first layer if the first flag bit indicates the absence of an additional layer, decodes the first and second layer if the second flag bit indicates the absence of the third layer, and decodes the first, second and third layers if the second flag bit indicates the presence of the third layer.

* * * * *